US005540050A

United States Patent [19]

Krupowicz

[11] Patent Number: 5,540,050

[45] Date of Patent: Jul. 30, 1996

[54] HYDRAULIC SYSTEM PROVIDING A POSITIVE ACTUATOR FORCE

[75] Inventor: William J. Krupowicz, Roscoe, Ill.

[73] Assignee: Caterpillar Inc., Peoria, Ill.

[21] Appl. No.: 203,918

[22] Filed: Mar. 1, 1994

[51] Int. Cl.$^{6}$ .................... F16D 31/02

[52] U.S. Cl. .................... 60/430; 60/452

[58] Field of Search .................... 60/421, 428, 429, 60/430, 452

[56] References Cited

U.S. PATENT DOCUMENTS

| | | | |
|---|---|---|---|
| 3,154,921 | 11/1964 | Junck et al. | 60/429 |
| 3,187,508 | 6/1965 | Thumim | 60/429 |
| 3,985,472 | 10/1976 | Virtue et al. | 417/216 |
| 4,029,439 | 6/1977 | Adams | 417/216 |
| 4,164,119 | 8/1979 | Parquet | 60/428 |
| 4,335,577 | 6/1982 | Lobmeyer et al. | 60/430 X |
| 4,372,193 | 2/1983 | Hall | 91/420 |
| 4,397,495 | 8/1983 | Lewis | 294/88 |
| 4,495,766 | 1/1985 | Krusche | 60/428 |
| 4,880,359 | 11/1989 | Hoffmeister et al. | 60/421 X |
| 5,083,428 | 1/1992 | Kubomoto et al. | 60/421 |
| 5,179,836 | 1/1993 | Dantlgraber | 60/430 |

FOREIGN PATENT DOCUMENTS

| | | |
|---|---|---|
| 58-163803 | 9/1983 | Japan . |

*Primary Examiner*—Hoang Nguyen
*Attorney, Agent, or Firm*—John W. Grant

[57] ABSTRACT

Hydraulically actuated grapple tongs mounted to a log skidder are useful, for example, in gripping a bunch of logs that are being dragged from one site to another. Maintaining a grip on the logs during the dragging operation with known hydraulic systems generates heat within the hydraulic systems. The subject hydraulic system includes first and second variable displacement load sensing pumps commonly connected to a control valve which controls fluid flow to an actuator. A load pressure signal is directed through a first signal line to a displacement controller of the first pump and to a pressure responsive valve normally resiliently biased to a position at which the first signal line is communicated to a displacement controller of the second pump. When the load pressure signal in the first signal line exceeds a predetermined value, the valve is moved to a position blocking communication of the load signal to the displacement controller of the second pump. This causes the displacement of the second pump to be reduced to a low standby condition so that only the fluid from the first pump is used to maintain a constant pressure in the actuator. The maximum displacement of the first pump is considerably less than the maximum displacement of the second pump so that the amount of heat generated in the hydraulic system when a constant pressure is maintained in the actuator is minimized.

4 Claims, 1 Drawing Sheet

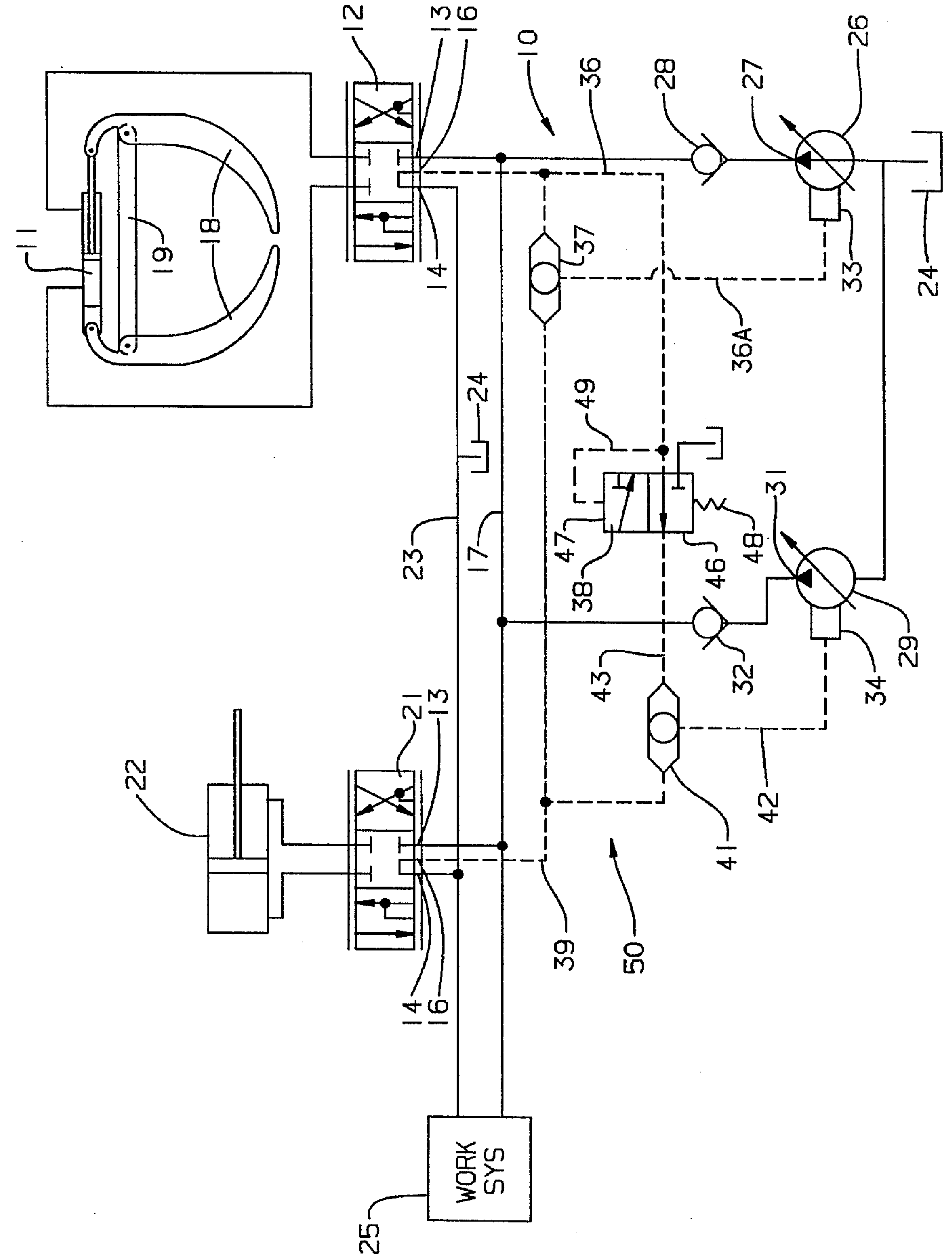
WORK SYS

HYDRAULIC SYSTEM PROVIDING A POSITIVE ACTUATOR FORCE

TECHNICAL FIELD

This invention relates generally to a hydraulic system and more specifically to providing a positive force on an actuator connected to a work implement.

BACKGROUND ART

Many grapple type log skidders used in forestry operations have a grapple supported from a boom mounted to the rear of the skidder. The grapple commonly includes a pair of opposed tongs which may be actuated by a hydraulic actuator to open and close around a group of logs. The boom is also commonly controlled by another hydraulic actuator for lowering and raising the grapple. The more sophisticated loaders may even have a mechanism for rotating the grapple relative to the boom and/or tilting the grapple relative to the boom.

Typically in operation, the grapple boom is lowered with the grapple tongs open to engage a group of logs and hydraulic pressure is then applied to the actuator to close the grapple tongs about the group of logs. The boom is then raised to lift a forward end of the logs off the ground so that the logs can be dragged from the cut site to the processing site.

One of the problems in the above operation is that when the logs are being dragged by the skidder, the logs have a tendency to slip creating a smaller mass about which the grapple tongs are closed. Such shifting could cause the grapple tongs to lose their grip on the logs sufficient to permit the loss of one or more of the logs. Thus, the operator had to diligently watch the logs and manually shift the control valve to readjust the grapple tongs when the grip on the logs loosened.

One of the early attempts to solve this problem included adding a detent to hold the grapple control valve in the grapple closed position during the dragging operation. However, if the grapple control valve of an open center grapple circuit is held in the grapple closed position, the hydraulic system overheats due to the full pump flow passing through a relief valve. That also consumes large amounts of power thereby reducing the available power to the drivetrain.

The overheating problem is reduced somewhat through the use of closed centered a load sensing hydraulic system in which the displacement of a variable displacement load sensing pump is reduced to a high pressure standby position when the grapple control valve is maintained in the grapple closed position. However, since the size of the variable displacement pump is normally selected to provide adequate flow for fast response time when more than one actuator is actuated at the same time, a considerable amount of heat is still generated in the system when the pump is maintained at a high pressure standby position for an extended period of time such as during a dragging operation.

Thus, it would be desirable to provide a hydraulic system for operating a grapple mechanism of a skidder wherein the hydraulic system has sufficient fluid flow capability for providing fast response of the actuators while providing positive fluid pressure to the actuator controlling the grapple tongs without generating excessive heat in the hydraulic system. Maintaining a positive fluid pressure on the actuator would automatically cause the actuator to readjust the position of the grapple tongs when the closing force on the tongs loosened due to shifting of the logs within the grapple.

The present invention is directed to overcoming one or more of the problems as set forth above.

DISCLOSURE OF THE INVENTION

In one aspect of the present invention a hydraulic system providing a positive actuator force includes at least one hydraulic actuator, a control valve in communication with the actuator and having an inlet port and a load signal port, and a supply conduit connected to the inlet port. A first variable displacement load sensing pump has a pressure responsive displacement controller and an outlet communicating with the supply conduit. A second variable displacement load sensing pump has a pressure responsive displacement controller and an outlet communicating with the supply conduit. A check valve is disposed to block fluid flow from the supply conduit to the outlet of the second pump. A first load signal line is connected to the load sensing port and to the displacement controller of the first pump. A second load signal line is connected to the displacement controller of the second pump and to the first signal line. A pressure responsive valve is disposed between the first and second signal lines and is movable between a first position communicating the first signal line with the second signal line and a second position blocking the first signal line from the second signal line. The valve has first and second ends, a spring disposed at the first end biasing the valve to the first position and a pilot line communicating the first signal line with the second end.

BRIEF DESCRIPTION OF THE DRAWINGS

The sole figure is a schematic illustration of an embodiment of the present invention.

BEST MODE FOR CARRYING OUT THE INVENTION

Referring now to the drawing, a hydraulic system 10 includes an actuator 11, a control valve 12 connected to the actuator 11 and having an inlet port 13, an outlet port 14, and a load signal port 16, and a supply conduit 17 connected to the inlet port 13. The actuator 11 is connected between a pair of tongs 18 pivotally connected to a frame 19. The system also includes another control valve 21 connected to another actuator 22 and having its inlet port 13 connected to the supply conduit 17. The actuator 22 is connected to a boom (not shown) normally used for raising and lowering the frame 19. A discharge conduit 23 connects the outlet port 14 with a tank 24. One or more control valve/actuator work systems represented at 25 may be connected to the supply and discharge conduits.

A variable displacement load sensing pump 26 has an outlet 27 communicating with the supply conduit 17 through a check valve 28. Another variable displacement load sensing pump 29 has an outlet 31 connected to the supply conduit 17 through a check valve 32. The check valve 28 and 32 block fluid flow from the supply conduit to the outlets 27 and 31 respectively. The variable displacement pumps each have a pressure responsive displacement controller 33,34 respectively. In this embodiment, the displacement controllers 33,34 have high pressure cutoff settings of 23,000 kPa and 21,000 kPa respectively and a low pressure standby setting of about 1400 kPa. In this embodiment, the maximum displacement of the pump 26 is less than the displacement of the pump 34. However, some of the benefits can be derived with the displacement of the pumps being about equal.

A load pressure signal line 36 is connected to the signal port 16 of the control valve 12, a shuttle valve 37 and to a pressure responsive valve 38. The shuttle valve 37 is connected to the displacement controller 33 through a portion 36A of the signal line 36. Another signal line 39 is connected to the signal port 16 of the control valve 21, to the shuttle valve 37 and to another shuttle valve 41. The shuttle valve 41 is connected to the displacement controller 34 through a signal line 42 and to the pressure responsive valve 38 through a signal line 43.

The pressure responsive valve 38 is movable between a first position communicating the signal line 36 with the signal line 43 and a second position blocking the signal line 36 from the signal line 43. The valve 38 has opposite ends 46,47, a spring 48 disposed at the end 46 biasing the spool to the first position and a pilot line 49 communicating the signal line 36 with the end 47. In this embodiment, the pressure responsive valve 38 is moved to its second position when the fluid pressure in the signal line 36 exceeds about 18,000 kPa.

The shuttle valves 37,41 constitute a shuttle valve means 50 for Communicating the load pressure from the signal line 39 to both displacement controllers 33,34 when the valve 38 is in its second position and the load pressure in the signal line 39 is higher than the load pressure in the signal line 36. The shuttle valves also communicate the load pressure from the signal line 39 to both displacement controllers when there is no load pressure in the rigid line 36.

INDUSTRIAL APPLICABILITY

In operation, opening of the tongs 18 is accomplished by moving the control valve 12 rightwardly and closing of the tongs is accomplished by moving the control valve 12 leftwardly. In either operating position, a load pressure signal equal to the hydraulic pressure in the actuator 11 is directed through the signal line 36, the shuttle valve 37 and the line portion 36A to the displacement controller 33. When the pressure level of the load pressure signal in the signal line 36 is less than a predetermined value of about 18,000 kPa as determined by the spring 48, the load pressure signal also passes through the valve 38, the signal line 43, the shuttle valve 41 and the signal line 42 to the displacement controller 34. This results in the displacement of both pumps 26,29 being adjusted to meet the fluid flow requirements determined by the degree of opening of the control valve 12.

If, however, the tongs are clamped around a bunch of logs and the load pressure increases above the predetermined value, the valve 38 is moved to its second position blocking the load pressure signal from the displacement controller 34. This causes the pump 29 to stroke back to its low pressure standby position such that only pump 26 is used to maintain a constant pressure in the actuator 11. When the pressure level of the fluid pressure signal in signal line 36 reaches the high pressure cutoff setting of the displacement controller 33, the displacement of the pump 26 is adjusted to its high pressure standby position. Since the displacement of the pump 26 is considerably less than the displacement of the pump in a single pump system, considerably less heat is generated by the pump 26 at its high pressure cutoff setting.

If the control valve 21 is actuated in either direction when the valve 38 is in its second fluid blocking position, a load pressure signal is directed through the signal line 39, the resolver 41 and the signal lime 42 to the displacement controller 34. The displacement of the pump 29 is immediately increased and its output flow combined with the output flow from the pump 26 such that both pumps are used to now supply the total demand for fluid by the system. If the load pressure signal in the signal line 36 is sufficient to maintain the valve 38 in its second flow blocking position, and the load pressure in the signal line 39 is higher than the load pressure signal in the signal line 36, the load pressure signal in the signal line 39 passes through the resolver 37 to the displacement controller 33 so that both pumps are utilized to provide the flow demand of the system.

If the logs gripped by the tongs should shift during a dragging operation, fluid flow from the pump 26 is automatically directed to the actuator 11 to move the tongs toward each other to again maintain adequate gripping pressure on the logs held within the tongs.

In view of the above, it is readily apparent that the structure of the present invention provides an improved hydraulic system for maintaining a constant pressure at an actuator while minimizing the amount of heat generated in the hydraulic system. This is accomplished by utilizing a pair of variable displacement load sensing pumps with the displacement of one pump being considerably less than the displacement of the other pump and using the smaller displacement pump for maintaining the constant pressure and reducing the displacement of the other pump to its low pressure standby position.

Other aspects, objects and advantages of this invention can be obtained from a study of the drawings, disclosure and the appended claims.

I claim:

1. A hydraulic system having at least one hydraulic actuator, and a control valve in communication with the hydraulic actuator and having an inlet port and a load signal port, comprising:

a first load sensing variable displacement pump having a pressure responsive displacement controller and an outlet;

a second load sensing variable displacement pump having a pressure responsive displacement controller and an outlet;

a supply conduit connected to the inlet port of the control valve and to the outlets of both pumps;

a check valve disposed to block fluid flow from the supply conduit to the outlet of the second pump;

a first load signal line connected to the load signal port of the control valve and to the displacement controller of the first pump;

a second load signal line connected to the displacement controller of the second pump; and a pressure responsive valve disposed between the first and second signal lines and movable between a first position communicating the first signal line with the second signal line and a second position blocking the first signal line from the second signal line, the valve having first and second ends, a spring disposed at the first end biasing the valve to the first position, and a pilot line communicating the first signal line with the second end.

2. The hydraulic system of claim 1 including another actuator, another control valve in communication with the another actuator, a third load pressure signal line connected to the load signal port of the other control valve, and shuttle valve means connected to the first, second and third signal lines for communicating the load pressure signal from the third signal line to both displacement controllers when the pressure responsive valve is in its second position and the load pressure in the third signal line is higher than the load pressure in the first signal line.

3. The hydraulic system of claim 1 wherein the displacement controllers have a high pressure cutoff setting with the high pressure cutoff setting of the displacement controller of the first pump being higher than that of the displacement controller of the second pump.

4. The hydraulic system of claim 3 wherein the pressure responsive valve is moved to its second position when the fluid pressure in the first signal is at a predetermined level less than the high pressure cutoff setting of the displacement controller of the second pump.

* * * * *